Jan. 7, 1958  E. P. PERRIN  2,819,119
WHEEL COVER
Filed Oct. 14, 1955
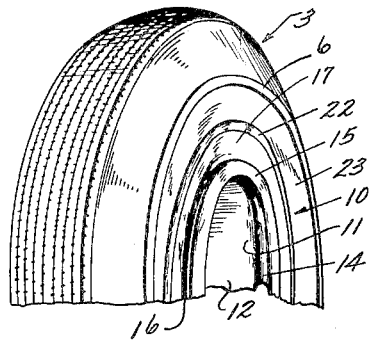
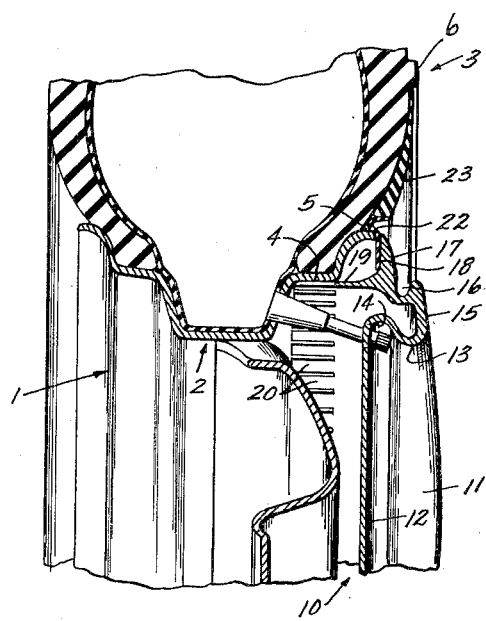
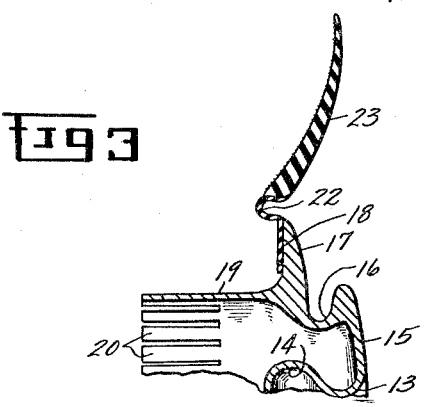
INVENTOR.
EDWARD P. PERRIN
BY
Jerome P. Bloom
HIS ATTORNEY—

United States Patent Office 2,819,119
Patented Jan. 7, 1958

2,819,119

WHEEL COVER

Edward P. Perrin, Dayton, Ohio

Application October 14, 1955, Serial No. 540,539

11 Claims. (Cl. 301—37)

This invention relates to a new and improved wheel cover of a complete nature which may be easily and quickly applied to or removed from the wheel assemblies of automotive vehicles and the like.

In the prior art many types of wheel and tire cover elements have been previously devised. Hub cap elements of a more or less decorative character have been employed to cover the central portions of wheel elements. These generally require the use of tools to pry them off. Annular elements have also been provided for application to the base of a tire as an adjunct to a hub cap so as to afford the simulation of a white wall to an ordinary tire. These annular elements have been either of metal or rubber and require mechanical or chemical mediums to insure their proper application to tire elements in use. The application and removal of these prior art elements is generally an involved procedure.

The subject invention provides a composite integrated wheel cover which not only affords complete protection and cover for the wheel portion of a wheel assembly, but, in addition, provides a novelly integrated, molded cover means for the complete side wall of a tire. The improved structure provided enables this complete cover to be quickly and easily mounted to a wheel assembly as a unit without the use of tools. The many advantages of the integral wheel assembly cover structure as enabled by the invention will become readily apparent from the detailed description of a practical embodiment thereof herein.

An object of the invention is to provide a new and novel wheel cover unit.

Another object of the invention is to provide a novel protective and decorative wheel cover which is particularly applicable to automotive vehicles and which can be quickly and easily mounted and dismounted without the use of tools.

An additional object of the invention is to provide a new and improved composite wheel assembly cover of an integrated nature affording a central protective and decorative hub cap connected by a bonded peripheral section of soft resilient rubber to a relatively rigid molded protective and decorative tire cover section so as to provide a complete unit which can be quickly and easily applied without tools and be highly resistant to displacement.

Another object of the invention is to provide a new and and improved wheel cover unit of a composite nature affording an improved hub element which can be efficiently gripped with the fingers to provide a mounting thereof which does not require the use of tools.

A further object of the invention is to provide a novel composite wheel cover structure of an integrated nature including a central metal hub section having friction engaging means for secure mounting to a wheel and having a peripheral section of resilient material integrated therewith and supportively connecting a molded tire cover section thereto of a nature and in a manner that the whole unit may be quickly and easily applied in an adhering manner to a wheel assembly, the said resilient section of material providing insurance for continued adherence of the cover unit in the event of shock to the wheel assembly.

The above primary objects and other incidental objects and advantages of the invention not detailed will become readily apparent to those versed in the art from the following description of a practical embodiment thereof, particularly when taken in conjunction with the accompanying drawings wherein:

Fig. 1 is a partial perspective view of a novel wheel cover in accordance with the invention as applied to a wheel assembly, Fig. 2 is a cross sectional view of the structure shown in Fig. 1 showing the detail of the wheel cover and its association with a wheel assembly, and Fig. 3 is a fragmentary cross sectional view of the wheel cover showing in detail the integrated nature of the components thereof.

A wheel assembly of a conventional nature is shown in the drawings and comprises a wheel 1 having a drop center rim 2 seating a tire 3 therein. The external side of the rim is stepped to provide a cylindrical bearing surface 4 adjacent to and spaced from the inner radius of the rim. The rim 2 has a peripheral flange having the normal bead 5 thereon. As the tire 3 seats in the rim 2, a slight divergence of the bead portion 5 of the rim from the base wall of the tire is effected.

The improved wheel cover shown includes a central hub cap section 10 of metal, plastic or the like which has a central concavity 11 in the outer surface thereof. A central disc shaped projection 12 from the surface of the concave portion 11 of the hub cap section affords means for application of an emblem thereto by embossing or other suitable means. The sides 13 of the concavity are recessed at 14 at the base thereof. From the concave portion 11 the hub cap section 10 is provided with a radial skirt portion 15 which is slightly diverging in cross-section and of relatively short radial dimension. At the periphery of the skirt portion 15 the outer surface of the hub cap section 10 is cut back slightly to provide a circular radial recess 16 therein. From the base of this recess 16 the cap section skirts outwardly again in radial fashion to a diameter generally conforming to the wheel to which the cover is to be applied. This provides a peripheral skirt 17. At the outer periphery of the skirt section 17 the outer surface of the hub cap section 10 projects directly radially inwardly to provide a rear annular abutment surface 18 thereby at right angles to the central axis thereof. The annular abutment surface 18, about the inner extremity thereof, is provided with an integrally connected cylindrical projection extending rearwardly thereof. This cylindrical projection is a wheel engaging friction ring 19 which has slots arranged therein in equidistantly spaced relation so as to provide it with leaf spring elements 20 for frictional engagement of the wheel portion of a wheel assembly in a manner to be described.

A relatively narrow annular strip 22 of soft rubber is bonded by any suitable means to the rear annular abutment surface 18 of the cap section 10. Bonded to the periphery of this annular strip 22 is an annular molded section 23 of hard rubber having a cross-sectional configuration as shown in Fig. 3 of the drawings. As shown therein, the inner connected portion of the section 23 is relatively thick and it tapers outwardly in a streamlined fashion to a very thin extremity. The under or inner surface of the section 23 is formed with a slight crisscrossed or staggered ridge arrangement therein to afford a high gripping quality thereto in a manner to be described.

The improved wheel cover is applied to a wheel assembly in the following manner. The hub section 10 is gripped in both hands with the thumbs engaging in the recess 14 within the concave portion 11 thereof at opposed sides and the fingers curling around the skirt portion 15 into the radial recess 16 thereabout. This gives an exceedingly firm and positive grip on the cover unit. The cover unit is then applied to the wheel assembly by directing the cylindrical rearwardly projecting engaging portion 19 within the cylindrical bearing surface 4 provided by the wheel rim 2. The leaf spring elements 20 of the engaging portion 19 of the wheel cover are slightly contracted and tightly engaged to the wheel rim as they seat thereto. As this seating is accomplished, the outer edge of the hub skirt 17 with the soft rubber element 22 bonded thereto seats against the bead 5 on the wheel rim, the inner portion of element 22 being intermediate the bead 5 and the annular abutment surface 18 of the hub section 10. This effects a positive frictional engagement of the cover unit to the wheel. Since the hard molded section 23 is connected by a short annular element 22 of soft rubber, as the hub section seats, the molded section will naturally conform and readily seat to the side of the tire 3 of the wheel assembly with the relatively very thin outer edge extending to and seating up against the tire bead 6. The relatively thick inner extremity of section 23 is caused by the nature of its connection to the hub section to seat into the root of the tire adjacent the wheel rim with the short soft rubber section 22 lying naturally adjacent the bead 5 of the rim. The nature of the ridged undersurface of the molded section 23 causes a suction like engagement of the tire wall to further increase the efficient and positive seating of the wheel cover to the tire and wheel of the wheel assembly. The provision for the soft rubber section 22 intermediate the cap section and the molded section 23 of the tire insures a flexibility of the cover that enables the section 23 to accommodate and adjust to change in tire contour on demand.

Thus, the invention provides an improved complete wheel cover unit which can be quickly and easily mounted to and dismounted from a wheel assembly. The novel connection of the molded section 23 to the hub section 10 provides a flexibility therebetween to accommodate tire adjustment yet one which aligns and supports the section 23 in relatively fixed fashion for proper positioning thereof on mounting so as to insure efficient adherence thereof to the tire element. The tapering shape of the molded section 23 also prevents ready dislodgment thereof since the outer extremity fits tightly into the bead of the tire. This, of course, permits that the section 23 may be made in any desired color and blend perfectly into the tire wall so as to simulate a tire with a colored surface. And the cap section affords very efficient handling in the configuration thereof. As can be readily seen, the gripping means provided on the cap section 10 enables a positively controllable unit which can be removed without the use of tools.

While a particular practical embodiment of the invention has been set forth herein, such is by way of example only. Many other modifications thereof will be readily apparent therefrom to those versed in the art as well as other advantages incident thereto which have not been particularly detailed herein. Such is to be construed as lying within the intended scope of the invention.

I claim:

1. A cover for a wheel assembly comprising, a disc section, wheel engaging means extending substantially at right angles thereto from the inner surface of said disc section, a narrow peripherally bonded section of relatively soft resilient material connected about said disc section, and a molded tire cover section bonded to said section of soft resilient material adapted to sealingly seat to the side wall of a tire on application of said disc section to engage the wheel portion of a wheel assembly and to accommodate tire flexure by its connection to said disc section through said section of relatively soft resilient material.

2. A wheel cover comprising, a formed disc-like member, an annular projection from the outer surface of said member having radial recesses therein, a relatively rigid molded annular element having a configuration conforming to the complete side wall of a tire, and a relatively elastic annular element respectively bonded to said member and to said relatively rigid element to supportively and resiliently connect said rigid element to said member, and wheel engaging means on said member whereby on grasping said member with the fingers engaging in said recesses, said cover may be quickly and easily mounted to and dismounted from the side of a wheel assembly without the use of tools, the cover readily seating in adhering fashion on application.

3. A wheel cover comprising, a central disc-like element having annular recesses therein in spaced relation to effect a positive gripping means thereby, an annular strip of resilient material bonded peripherally to said disc-like element, an annular molded section of relatively rigid material bonded to said annular strip of resilient material to afford a supportive yet resilient connection therebetween, and wheel engaging means integrally connected to and projecting rearwardly of said disc-like element in cylindrical fashion whereby on manually grasping said gripping means, said disc-like element may be readily and positively engaged to a wheel causing said molded section to adheringly and resiliently seat to the side wall of the tire fixed to the wheel and afford a complete cover therefor to the bead thereon, said resilient strip providing means enabling said molded section to adhere to the tire wall on flexure thereof.

4. A wheel cover comprising, a central disc-like element having spaced annular recesses therein to afford a gripping means adjacent the outer periphery thereof, an annular strip of soft rubber bonded to and extending peripherally from said disc-like element, an annular molded section of hard rubber bonded to said strip of soft rubber to afford a supportive yet resilient connection therebetween, and resilient wheel engaging means integrally connected to and projecting rearwardly of said disc-like element in cylindrical fashion whereby on manually grasping said gripping means said disc element will readily and positively seat to a wheel element causing said molded section to adheringly and resiliently seat to the side wall of a tire fixed to the wheel and afford a complete protective cover therefor to the bead thereon, said soft rubber section providing means enabling said molded section to adhere to the tire wall on flexure thereof.

5. A wheel cover comprising, a disc-like element, said element having means on the outer surface thereof affording opposed annular recesses therein providing gripping means for said element, a narrow annular strip of resilient material bonded to said element to extend peripherally therefrom, an annular section of relatively rigid formed material bonded to said resilient strip to afford a supportive yet resilient connection therebetween, and a cylindrical extension connected integrally with said element at the inner surface thereof having rearwardly extending resilient leaf sections whereby on manually grasping said gripping means, said disc-like element may be easily and quickly applied to a wheel with the leaf sections effecting a frictional engagement therewith causing said formed section to simultaneously resiliently and adheringly seat to the side wall of the tire fixed to the wheel and afford a complete cover therefor to the bead thereof, said resilient strip providing means enabling said molded section to adhere to the tire wall on flexure thereof.

6. A wheel cover comprising, a formed disc-like member, an annular projection from the outer surface of said member, finger grip means provided in said annular projection, a relatively rigid molded annular member having a configuration conforming to the complete side wall of a tire, said rigid member tapering in cross-section from a relatively thick inner radial extremity to a very thin outer radial extremity, a relatively elastic annular element respectively bonded to said disc-like member and to said relatively rigid member to provide a supportive and resilient connection therebetween, and wheel engaging means on said disc-like member whereby on grasping of the disc-like member at the finger grip means, said cover may be quickly and easily mounted to and dismounted from the side of a wheel assembly without the use of tools, the cover naturally seating in adhering fashion to the wheel and tire thereon.

7. The structure as set forth in claim 6, said wheel engaging means consisting of resilient leaf-like elements arranged in cylindrical fashion and extending rearwardly of said disc-like element to frictionally engage to a wheel element on mounting of said cover thereto, and the undersufrace of said relatively rigid member being formed to provide ridges therein so as to afford a sealing grip on seating to the side wall of a tire on mounting of said cover.

8. A wheel cover comprising, a formed disc-like member having a peripheral skirt generally conforming in diameter to the wheel to which the cover is to be applied, finger grip means provided on the outer surface of said disc-like member adjacent the periphery thereof, a relatively rigid molded rubber element of a nature conforming to the side wall of a tire, an annular element of relatively soft rubber respectively bonded to said member and to said rigid rubber element to provide a supportive resilient connection therebetween, said rigid element being tapered in cross-section from the inner to the outer radial extremity thereof, and means connected to the inner surface of said disc-like member for connecting to a wheel element on mounting said cover to a wheel assembly, said rigid rubber element naturally seating and conforming to the side wall of the tire on the wheel element on application of said disc-like member, said finger grip means being so arranged to enable dismounting of said cover from a wheel assembly without the use of tools.

9. A cover for a wheel assembly comprising, a disc-like element having means providing a central concavity therein, said means having an annular recess therein, a streamlined skirt section on said disc-like element having a second annular recess therein arranged in spaced opposed relation to the first mentioned recess, and mounting means projecting rearwardly of said skirt section for frictional engagement to the wheel element of a wheel assembly, an annular strip of resilient material bonded to said skirt section to extend peripherally therefrom, an annular molded section of relatively rigid material bonded peripherally of said resilient strip to provide a supportive yet resilient connection therebetween, said molded section having a ridged undersurface whereby on manually grasping said disc-like element with the fingers engaging in said recesses provided therein, said cover may be easily and quickly mounted to and dismounted from a wheel assembly, said molded section being so arranged to resiliently and adheringly seat to the side wall of the tire of the wheel assembly on engaging of said mounting means to the wheel element thereof.

10. A cover for a wheel assembly comprising, a disk section, a narrow peripherally bonded section of relatively soft resilient material connected about said disk section, and a molded tire cover section bonded to said section of soft resilient material adapted to sealingly seat to the side wall of a tire on application of said disk section to the wheel portion of a wheel assembly and to accommodate tire flexure by its connection to said disk section through said section of relatively soft resilient material.

11. A cover for a wheel assembly comprising, a disk section, wheel engaging means connected thereto, a peripherally bonded section of relatively soft resilient material connected to said disk section, and a tire cover section bonded to said section of soft resilient material adapted to sealingly seat to the side wall of a tire on application of said disk section to engage the wheel portion of a wheel assembly and to accommodate tire flexure by its connection to said disk section through said section of relatively soft resilient material.

References Cited in the file of this patent

UNITED STATES PATENTS

| 1,161,236 | Marcuse | Nov. 23, 1915 |
| 1,743,074 | Roth | Jan. 7, 1930 |
| 1,956,805 | Meyer | May 1, 1934 |
| 1,968,076 | Goodyear et al. | July 31, 1934 |
| 2,696,409 | Barnes | Dec. 7, 1954 |